Jan. 7, 1930. T. R. RENWICK 1,742,217
WOODWORKING SHAPER
Filed July 12, 1928 2 Sheets-Sheet 2

Patented Jan. 7, 1930

1,742,217

UNITED STATES PATENT OFFICE

THOMAS R. RENWICK, OF GRAND RAPIDS, MICHIGAN, ASSIGNOR TO OLIVER MACHINERY COMPANY, OF GRAND RAPIDS, MICHIGAN, A CORPORATION OF MICHIGAN

WOODWORKING SHAPER

Application filed July 12, 1928. Serial No. 292,142.

This invention relates to a wood working shaper and is particularly concerned with novel improvements in wood working machines of this character whereby the shaper may be driven by an electric motor at very high speed, have all of the necessary adjustments which a machine of this character must have and at the same time greatly reduce the floor space heretofore required for motor driven shapers and eliminate excessive belt tension with the resultant consumption of power which comes therefrom. Another object and purpose of the invention is to provide a very effective power cut-off mechanism mounted in conjunction with a brake whereby the shaper may be stopped in its operation very quickly should occasion require, the operation of the switch to disconnect the power followed immediately by moving the brake into operative position occurring as parts of the same action on the part of the operator.

Many other objects and purposes than those state will be apparent as an understanding of the invention is had from the following description taken in connection with the accompanying drawings, in which.

Like reference characters refer to like parts in the different figures of the drawings.

Figure 1:
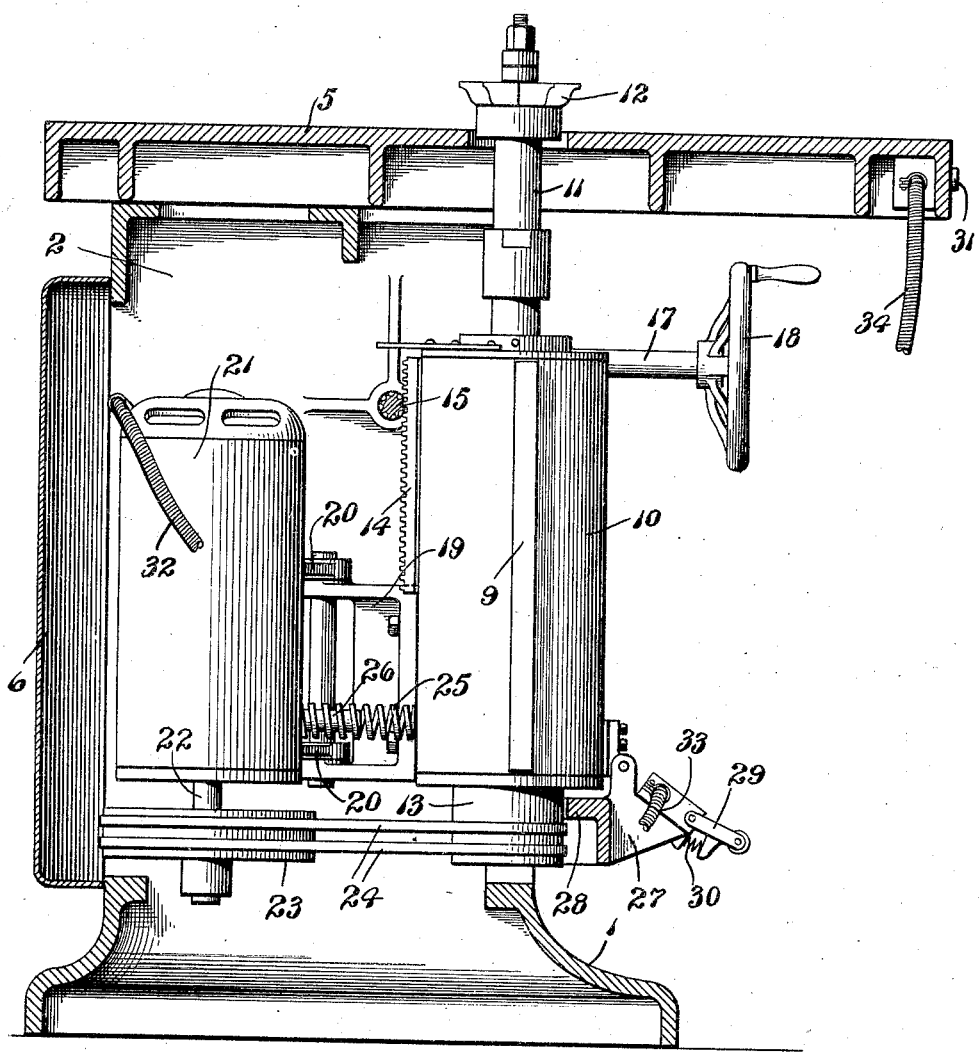
Fig. 1 is a vertical section through the machine, the electric motor, the shaper spindle assembly and the connections between the same being shown in elevation.
Figure 2:
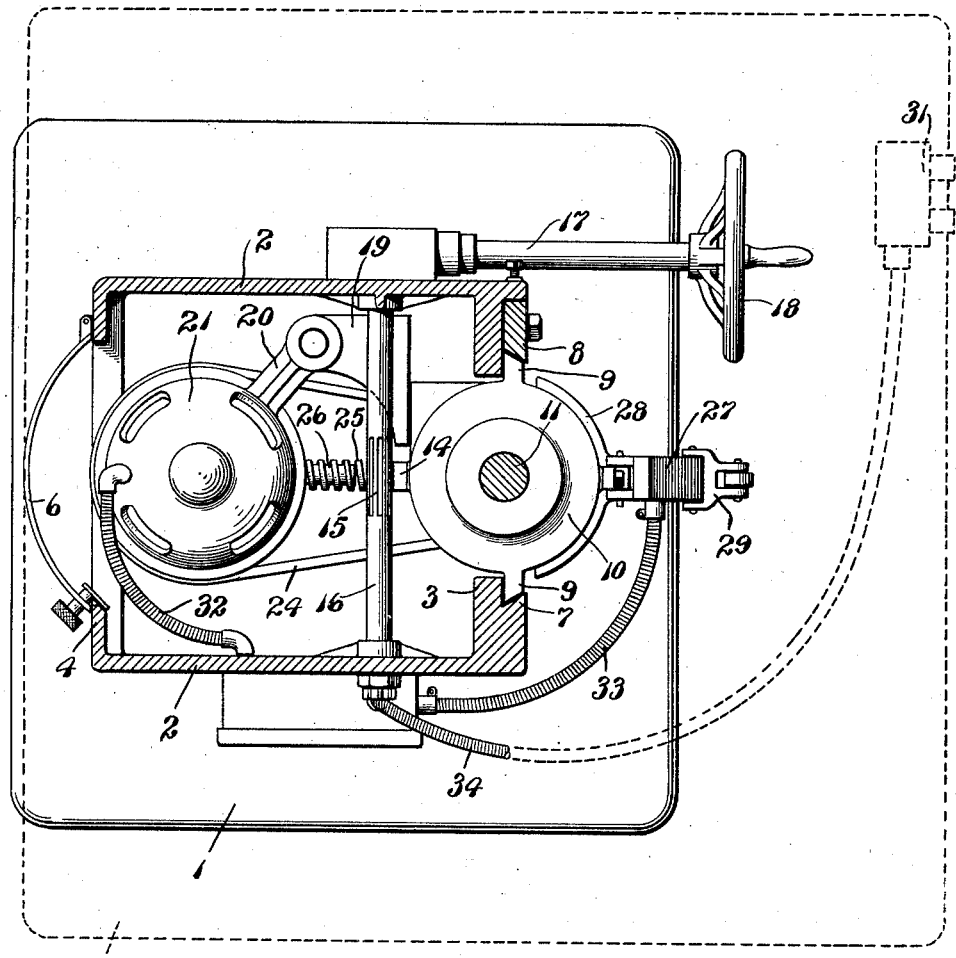
Fig. 2 is a fragmentary section through the upper portion of the mechanism on a plane below the work table.
Figure 3:
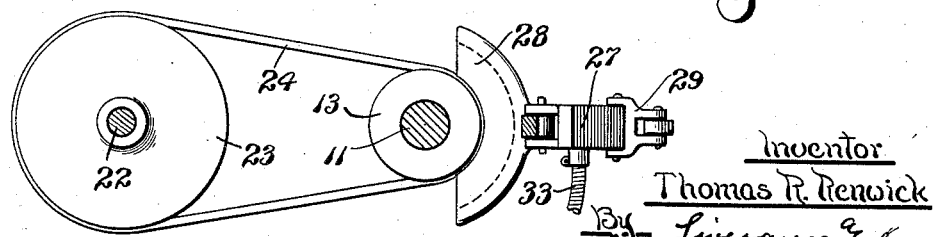
Fig. 3 is a fragmentary horizontal section taken on a plane immediately below the lower end of the motor.

In the construction of the machine, a supporting frame or housing is used having a base 1, parallel vertical spaced apart sides 2 extending upwardly from the base, a front 3 which is cut away at its middle portion for the reception of the shaper spindle assembly, as will hereafter appear, and a back 4 which also has a relatively wide opening therein for access to the mechanism from the back. A work table 5 is carried at the upper end of the supporting frame in the usual manner. The opening in the back 4 is closed by a door 6 of sheet metal, as shown in Figs. 1 and 2.

The front 3 of the supporting frame is provided near one side with a guide 7 and at the opposite side carries a gib 8. Between the guide 7 and the gib 8 the shaper spindle assembly is mounted, including a spindle housing 10 from which diametrically opposed ribs 9 extend to cooperate with and bear against the guides 7 and 8. The form of the guides and the form of the edges of the ribs 9 are substantially that shown in Fig. 2, whereby the shaper spindle housing is securely mounted on the supporting frame and may be vertically adjusted thereon. The shaper spindle 11 is a vertical spindle mounted in the housing 10 and extending upwardly above the same, at its upper end carrying a suitable cutter 12 which lies above the table 5, while at its lower end it is equipped with a combined drive pulley and brake drum 13.

At the rear side of the spindle housing 10 a vertical rack 14 is secured, meshing with which are pinion teeth 15 formed in the length of a cross shaft 16 mounted for rotation on and between the sides 2 of the supporting frame. The shaft 16 is adapted to be turned by a second shaft 17 which extends forward and has a hand wheel 18 at its front end, any suitable form of gearing connections between the adjacent ends of the shafts (not shown) being used. It is evident that by operating the hand wheel 18 the cutter head 12 may be raised or lowered with respect to the table 5 so as to properly shape the work that is passed over the table.

At the rear of the housing 10 and to one side thereof a bracket 19 is located and permanently secured. Said bracket extends rearwardly near one side 2 of the support, and at its rear end has two arms 20 pivotally connected thereto. The arms 20 extend from the housing of an electric motor 21, the shaft 22 of which extends downward and is equipped with a drive pulley 23 located in substantially the same horizontal plane as the pulley 13. A plurality of endless belts 24 pass around the two pulleys 13 and 23. These belts are of the V-shape type and are received in grooves in the pulleys. A coiled compression spring 25 is disposed between the spindle housing 10 and the motor housing, the tendency of which is to force the motor with its pulley 23 away from the spindle housing 10 and the spindle pulley 13. One end of the spring 25 is located around a horizontal post 26 projecting from the motor housing. In this manner the belts 24 are kept at requisite tension.

It is evident by reason of this direct connection of the driving motor to the spindle assembly that any vertical adjustment of the shaper spindle and its housing is accomplished by the same adjustment vertically of the motor and the driving pulley associated therewith. This eliminates any need of long driving pulleys on the shaper spindle around which a flat belt from the electric motor driving pulley is passed, a wide spindle pulley being necessary in order to permit the various adjustments of the spindle with the motor driving the same remaining in fixed position. It also eliminates the necessity of extremely high tension in the belt drive such as is necessary with the flat belt described. Elimination of the high belt tension removes heavy pressure from the spindle bearings with a great reduction in friction and wear, and is also very economical in the matter of saving of power which previously in motor driven shapers has been expended in overcoming the excess friction necessitated by high belt tension.

In order to stop the shaper quickly a brake is mounted adjacent the driven pulley 13. In the construction a bracket 27 is pivotally suspended from the lower end of the housing 10 which, at its rear side, carries a brake 28 shaped to fit against the surface of the pulley 13 above where the belts 24 pass around the same. At the lower front portion of the bracket 27 a make and break switch is mounted which is operated by stepping upon the outer end of a lever 29 pivoted on the bracket 27 and normally held in upper position by a spring 30, in which position the electric current to the motor is uninterrupted; but on pressing against the outer end of the lever 29 the switch is operated to break the electric circuit thus interrupting the power driving the spindle 11, and with a continuation of foot pressure upon the lever 29 the bracket 27 is moved about its pivot to bring the brake 28 against the upper end portion of the pulley 13, thus applying a friction brake which quickly brings the spindle to a stop.

The usual control switch for stopping the machine is mounted at 31 at the front side of the table 5. Any suitable electric wiring housed within the covering tubes 32, 33 and 34 is used to make the circuits between the motor, the control switch 31 and the auxiliary control switch at 29. The specific detail of this construction is not part of the present invention and is not specifically illustrated and described.

The invention set forth has proved one of very practical merit. Motor driving shaper spindles by belts is not new but the very compact and space saving arrangement which I have provided places all of the mechanism beneath the shaper table and greatly saves the amount of floor space in a factory required, while the mounting of the motor in the manner described to move with the shaper spindle as it is vertically adjusted makes it easy to use relatively light belts for driving even at very high speeds, at least 7200 R. P. M. and sometimes as high as 10000 R. P. M. without undue wear on the belts, without danger of breaking the belts because of high belt tension and with a resultant longer life to the machine and a smaller consumption of electric current for driving the same. These features combine to make the invention one of merit. The invention is defined in the appended claims and is to be considered comprehensive of all forms of structure coming within their scope.

I claim:

1. A machine of the class described comprising, a support, a shaper spindle housing vertically mounted on said support, a horizontal table at the upper end of the support, a shaper spindle extending upwardly through the table and provided with a pulley at its lower end, an electric motor mounted on and to one side of the shaper spindle housing having a motor shaft, a driving pulley fastened to the shaft, and belt driving means passing around said drive pulley and pulley on the shaper spindle, said electric motor, pulleys, belt driving means and shaper spindle housing all being located beneath the table and inside the vertical planes of the edges thereof.

2. A machine of the class described comprising, a supporting frame, a horizontal table fixed at the upper end of the frame, a spindle housing mounted for vertical adjustment on the frame, a vertical spindle mounted in said housing and extending above the same through the table, a pulley fastened to the lower end of the spindle below said housing, means for manually raising or lowering said spindle housing together with said spindle and pulley, an electric motor located to one side of the spindle housing, means for mounting the electric motor on the spindle housing for movement toward or away from the housing, said motor having a downwardly extending motor shaft, a drive pulley secured to said shaft, belt driving means passing around the driving pulley and the spindle pulley, and spring means interposed between said motor and spindle housing acting normally to force the motor away from said housing and thereby tension the belt driving means.

3. In a machine of the class described, a supporting frame, a horizontal table located on and fixed to the upper end of said frame, a shaper spindle housing mounted vertically on said frame below the table, a spindle rotatably mounted in said housing and extending upwardly through the table, a pulley at the lower end of the spindle below the spindle housing, an electric motor positioned back of said housing and located below the table, means for mounting the motor on the spindle housing for movement away from or toward said housing, means normally tending to force the motor away from the housing and belt driving means passing around the motor pulley and the spindle pulley.

4. In a machine of the class described, a supporting frame, a horizontal table carried at the upper end of the frame, a shaper spindle positioned vertically and rotatably mounted on said frame and extending through the table, an electric motor mounted to one side of the shaper spindle and located below said table, belt driving means for driving the spindle from said motor and means for maintaining a substantially constant tension on the belt.

5. In a machine of the class described, a supporting frame, a horizontal table located at the upper end of the frame, a spindle housing positioned vertically and mounted on said frame below the table, a spindle rotatably mounted in said housing and extending above the same through the table, a pulley secured to the lower end of the spindle below its housing, an electric motor, means for driving the spindle from said motor, and a foot brake combined with an electric switch mounted at the lower end of the spindle housing, said brake lying closely adjacent said pulley and adapted to be foot pressed into braking engagement therewith simultaneously or shortly after the switch is operated by bringing the foot into contact with the switch and brake.

6. In a shaper, a vertical spindle housing, a vertical spindle mounted for rotation in the housing, a pulley secured at the lower end of the spindle below said housing, an electric motor, means for driving said pulley from the electric motor, a pivotally mounted brake member suspended from the spindle housing adjacent the lower end thereof and carrying a brake in front of the spindle pulley, and a switch movably mounted on said brake member operation of which will break the electric circuit to the electric motor whereby the switch and brake member are adapted for foot operation to stop the motor and immediately bring the brake against the spindle pulley.

7. In a machine of the class described, a support, a horizontal table carried by said support, a shaper spindle positioned vertically and mounted on said support for vertical adjustment, a motor, means for mounting said motor for vertical movements with the shaper spindle whereby the relative vertical positions of the motor and the spindle remain constant, belt driving means for driving the spindle from the motor, and means for maintaining a substantially constant tension on the belt.

8. In a machine of the class described, a support, a horizontal table carried by said support, a shaper spindle positioned vertically and mounted on said support for vertical adjustment, a motor, belt driving means for driving the spindle from the motor, and means for maintaining a substantially constant tension on the belt.

In testimony whereof I affix my signature.
THOMAS R. RENWICK.